Feb. 9, 1926.                                                     1,572,345
                          A. WOLLENSAK
                       PHOTOGRAPHIC SHUTTER
                     Original Filed July 29, 1920
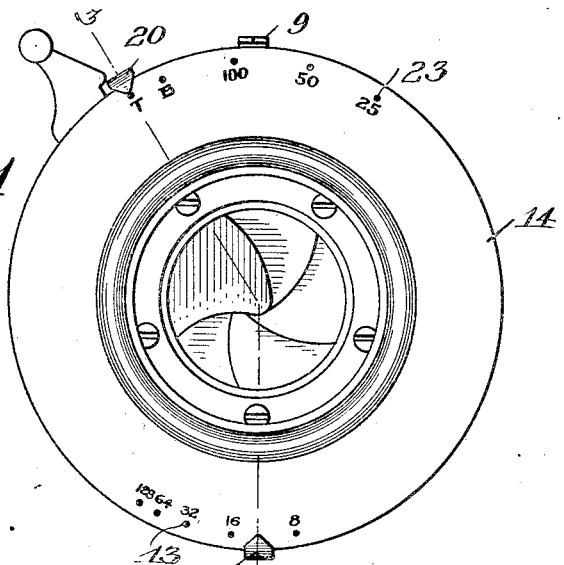
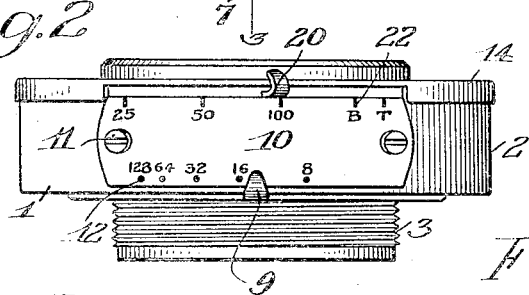
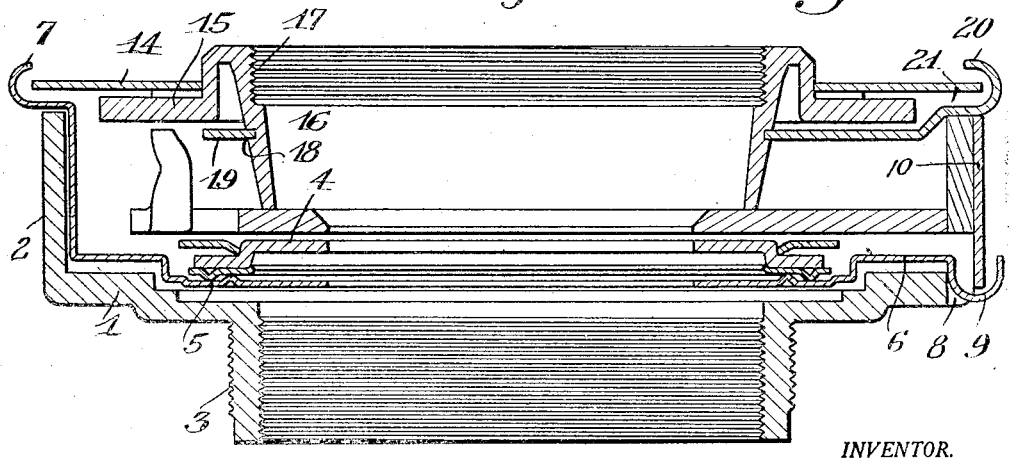
INVENTOR.
Andrew Wollensak
BY
his ATTORNEY Patented Feb. 9, 1926.

1,572,345

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

Original application filed July 29, 1920, Serial No. 399,939. Divided and this application filed March 28, 1924. Serial No. 702,678.

*To all whom it may concern:*

Be it known that I, ANDREW WOLLENSAK, a citizen of the United States, residing at Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photographic shutters and more particularly to the type in which the iris diaphragm, shutter blades and shutter mechanism are incorporated in a housing, an object of the invention being to provide for mounting the indications for the speed of the shutter and the opening of the diaphragm in juxtaposition on the top of the shutter so that the shutter and diaphragm may be adjusted from the rear of the camera. The improvements mainly relate to means whereby the shutter adjustments and diaphragm adjustments are associated in a convenient manner whereby both may be conveniently read from the same scale and from a point of view other than one in front of the camera. To these and other ends the invention resides in certain improvements and combinations of parts all as will be hereinafter more fully described, the novel features being pointed out in the claims at the end of the specification.

In the drawings:

Figure 1 is a front elevation of a photographic shutter constructed in accordance with and illustrating one embodiment of my invention;

Figure 2 is a top plan view thereof and

Figure 3 is an enlarged sectional view taken on the line 3—3 of Figure 1.

Similar reference numerals throughout the several views indicate the same parts.

This application is a division of my co-pending application which has resulted in Patent Number 1,488,523, dated April 1, 1924 which discloses both the indicating devices herein claimed and other features of shutter construction not specifically necessary to practice of the present invention. The shutter as shown herein and in the said parent application comprises a rear casing wall 1 which has, in this instance, an annular flange 2 on one side thereof forming a chamber. Projecting from the opposite side of the casing wall 1 is an annular frame 3 which is internally and externally threaded, the external threads being provided for the attachment of the shutter to a suitable support and the internal threads being provided for engagement by the rear lens mounting.

Against the rear wall 1 of the casing the iris diaphragm is supported. This iris diaphragm is novel in construction as is the mounting thereof in the shutter casing but it has nothing to do with the present invention being described in detail in the parent application. Any construction thereof suffices for the present invention which relates to its control rather than its mode of operation and it therefore suffices to say that the diaphragm comprises, so far as shown, a ring or annular central portion 4 suitably supported by lugs (not shown) on the wall 1. The diaphragm blades are suitably supported between this ring and the rear wall 1 on the casing against which latter is an operating ring 5 with which this invention is most concerned and the rotation of which operates the leaves in the usual manner. The rotary movement of the operating ring may be effected by two lateral extensions 6 and 7 the former of which extends through a slot 8 in the casing wall 2 and has a portion 9 which overhangs a plate 10 secured by screws 11 to the periphery of the shutter casing, said plate containing indicating matter 12 which will indicate the position of the iris diaphragm. The other lug 7 also acts as an indicator and operating portion for the iris operating ring and cooperates with indications 13 on a front plate 14 of the casing over which said lug or indicator travels to be viewable and readable as an index from the front of the shutter, said indications 13 being in the present instance at the bottom edge of the latter.

The other indicator 9, cooperating as it does with the index plate 10 on the top of the casing is viewable and readable from above the shutter as is apparent. The casing is closed by the cover plate 14 heretofore mentioned and by an annular member 15 which is formed with an outwardly and inwardly turned flange 16 which is internally threaded at 17 for securing one of the lens elements. It is also provided with an annular groove 18 on its exterior within the casing and within this groove a controlling ring 19 is mounted to turn, this controlling ring having a portion 20 bent through a recess 21 in the member 15 and extending to the exterior of the casing, whereby the controlling member 19 may be turned from the exterior of said casing. This portion 20 operates adjacent to a scale 22 on one edge of the plate 10 which also carries the indications 12 for the iris diaphragm. By this arrangement, the indications for the speed of the shutter (controlled by the ring 19 as fully explained in my said parent application) as well as the iris diaphragm may be viewed from the edge of the shutter at the top thereof so that the user of the camera may adjust the shutter while standing in rear of the camera and just prior to focusing.

The controlling member 19 is part of a retarding mechanism provided in connection with the shutter blade actuating mechanism in the manner well known in this art and illustrated for example in the structure disclosed in my said application of which this is a division. The cover plate 14 may also be provided with indications or graduations 23 over which the operating and indicating portion 20 of the controlling member 19 may travel so that the shutter may be adjusted for speed from the front of the camera as well as from the top thereof.

I claim as my invention:

1. A photographic shutter comprising shutter blades, blade operating mechanism, controlling means for the blade operating mechanism to obtain different speeds, said controlling means having an index, an iris diaphragm adjustable to obtain different openings and having an index, and two separate indicating means arranged in proximity to each other on the top edge of the shutter casing, one of said indicating means cooperating with the index of the blade controlling means and the other of such indicating means cooperating with the index of the diaphragm.

2. A photographic shutter comprising shutter blades, blade operating mechanism, controlling means for the blade operating mechanism to obtain different speeds, said controlling means having an index, an iris diaphragm adjustable to obtain different openings and having an index, and a single plate secured to the top edge of the shutter casing, said plate having indicating matter along opposite sides, one for cooperation with the index of the blade controlling mechanism and the other for cooperation with the index of the diaphragm.

3. A photographic shutter comprising shutter blades, blade operating mechanism, controlling means for the blade operating mechanism to obtain different speeds, said controlling means having an index, an iris diaphragm adjustable to obtain different openings and having an index, two separate indicating means arranged in proximity to each other on the top edge of the shutter casing, one of said indicating means cooperating with the index of the blade controlling means, and the other of such indicating means cooperating with the index of the diaphragm, and indicating matter arranged on the front of the shutter casing to cooperate with the index of the shutter controlling mechanism.

ANDREW WOLLENSAK.